(12) United States Patent
Suwa et al.

(10) Patent No.: US 7,740,903 B2
(45) Date of Patent: *Jun. 22, 2010

(54) METHOD FOR MANUFACTURING MAGNETIC RECORDING MEDIUM

(75) Inventors: Takahiro Suwa, Tokyo (JP); Kazuhiro Hattori, Tokyo (JP); Shuichi Okawa, Tokyo (JP)

(73) Assignee: TDK Corporation, Tokyo (JP)

( * ) Notice: Subject to any disclaimer, the term of this patent is extended or adjusted under 35 U.S.C. 154(b) by 465 days.

This patent is subject to a terminal disclaimer.

(21) Appl. No.: 11/708,595

(22) Filed: Feb. 21, 2007

(65) Prior Publication Data

US 2007/0195459 A1  Aug. 23, 2007

(30) Foreign Application Priority Data

Feb. 22, 2006  (JP)  ............... 2006-045282

(51) Int. Cl.
  B05D 5/12  (2006.01)
  B05D 3/00  (2006.01)
  B44C 1/22  (2006.01)
  C23F 1/00  (2006.01)
  G11B 7/24  (2006.01)
  G11B 5/33  (2006.01)

(52) U.S. Cl. ............... 427/131; 427/127; 427/271; 216/22; 216/38; 216/41; 216/48; 216/58; 216/65; 216/72; 216/60; 369/275.3; 428/800

(58) Field of Classification Search ............ 427/127, 427/131, 271; 216/22, 38, 41, 48, 58, 60, 216/65, 72; 369/275.3; 428/800

See application file for complete search history.

(56) References Cited

U.S. PATENT DOCUMENTS

| 4,839,311 | A  | * | 6/1989 | Riley et al. ............... 438/14 |
| 4,935,278 | A  |   | 6/1990 | Krounbi et al. |
| 6,014,296 | A  |   | 1/2000 | Ichihara et al. |
| 6,414,307 | B1 |   | 7/2002 | Gerlach et al. |
| 6,583,957 | B1 |   | 6/2003 | Takeshita et al. |
| 6,586,044 | B1 |   | 7/2003 | Takeshita et al. |
| 6,881,351 | B2 | * | 4/2005 | Grynkewich et al. ........ 216/22 |

(Continued)

FOREIGN PATENT DOCUMENTS

JP  A 1-279421  11/1989

(Continued)

*Primary Examiner*—Timothy H Meeks
*Assistant Examiner*—Mandy C Louie
(74) *Attorney, Agent, or Firm*—Oliff & Berridge, PLC

(57) ABSTRACT

A method for manufacturing magnetic recording media is provided, by which a magnetic recording medium that has a recording layer formed in a concavo-convex pattern, a sufficiently flat surface, and good recording/reproducing properties can be manufactured. The method includes the steps of: depositing a first filling material over a workpiece to cover recording elements formed as convex portions of the concavo-convex pattern, and to fill at least part of a concave portion; depositing a detection material over the first filling material; depositing a second filling material over the detection material; and irradiating a surface of the workpiece with a process gas to flatten the surface. In the flattening step, a component of the detection material removed from and flying off the workpiece is detected to stop the irradiation with the process gas based on a result of detecting the component of the detection material.

4 Claims, 9 Drawing Sheets

U.S. PATENT DOCUMENTS

| | | | |
|---|---|---|---|
| 7,378,029 B2 | 5/2008 | Hattori et al. | |
| 7,538,041 B2 * | 5/2009 | Takai et al. | 438/720 |
| 2005/0199581 A1 * | 9/2005 | Suwa et al. | 216/22 |
| 2005/0225898 A1 * | 10/2005 | Huang et al. | 360/126 |
| 2007/0000861 A1 | 1/2007 | Kamata et al. | |

FOREIGN PATENT DOCUMENTS

| | | |
|---|---|---|
| JP | A-03-034426 | 2/1991 |
| JP | A-03-253586 | 11/1991 |
| JP | A-05-291195 | 11/1993 |
| JP | A-06-005597 | 1/1994 |
| JP | A 9-97419 | 4/1997 |
| JP | A-10-209128 | 8/1998 |
| JP | A 2000-195042 | 7/2000 |
| JP | A-2003-504616 | 2/2003 |
| JP | A 2003-78185 | 3/2003 |
| JP | A-2005-235357 | 9/2005 |
| JP | A-2007-012119 | 1/2007 |

* cited by examiner

METHOD FOR MANUFACTURING MAGNETIC RECORDING MEDIUM

BACKGROUND OF THE INVENTION

1. Field of the Invention

The present invention relates to a method for manufacturing a magnetic recording medium having a recording layer formed in a concavo-convex pattern.

2. Description of the Related Art

Conventional magnetic recording media such as hard disks have been significantly improved in areal density, e.g., by employing finer magnetic grains or alternative materials for the recording layer(s) and by advanced microprocessing of magnetic heads. Although further improvements in areal density are still being sought, these conventional approaches to the improvement of areal density have already reached their limits due to several problems that have arisen. These problems include the limited accuracy of microprocessing of magnetic heads, erroneous recording of information on tracks adjacent to the target track due to spread of a recording magnetic field produced by the magnetic head, and crosstalk during reproducing operations.

As candidate magnetic recoding media that could enable further improvements in areal density, discrete track media or patterned media have been suggested which have a recording layer(s) formed in a concavo-convex pattern and have recording elements formed as the convex portion of the concavo-convex pattern. On the other hand, for magnetic recording media such as hard disks, the flatness of the surface(s) thereof is important in order to stabilize the flying height of the head and thereby provide good recording/reproducing properties. In this context, use of filling material has been suggested to fill the concave portions between the recording elements to thereby flatten the top surfaces of the recording elements and filling materials (e.g., see Japanese Patent Laid-Open Publication No. Hei 9-97419).

Dry etching, for example, can be utilized to form the recording layer in a concavo-convex pattern. There are several techniques available to fill the concave portion with a filling material and flatten the top surfaces of the recording element and the filling material, such as sputtering, CVD (Chemical Vapor Deposition), and IBD (Ion Beam Deposition). These deposition techniques can be used to deposit the filling material on the concavo-convex patterned recording layer to fill the concave portions between the recording elements. Then, an excess part of filling material deposited above the top surface of the recording elements (the surface opposite to the substrate) may be removed by dry etching.

To provide good magnetic properties for the recording layer, the excess part of the filling material is preferably completely removed but the top surface of the recording element is not processed. That is, it is preferable to control the dry etching in the flattening step so that the endpoint of the etching is flush with the top surface of the recording element.

In the case of dry etching, a component of the recording element removed from and flying off the workpiece can be detected by secondary-ion mass spectrometry (SIMS) or quadrupole mass spectrometry (QMS). The etching can thus be stopped upon detecting the component of the recording element, thereby keeping the extent of variation in the etching endpoint to within several nanometers of the top surface of the recording element.

However, in order to detect a component of the recording element by secondary-ion mass spectrometry or quadrupole mass spectrometry, it is necessary to etch not only an excess part of filling material but also the recording element. Accordingly, a several-nanometer portion near the upper portion of the recording elements will be unavoidably etched, causing degradation in its magnetic property.

In this context, a technique is known in the field of semiconductors for depositing a detection material over the corresponding portions of the recording elements that are to be protected against etching, and detecting a component of the detection material, thereby stopping the etching (e.g., see Japanese Patent Laid-Open Publication No. 2003-078185).

This technique can also be utilized in the field of magnetic recording media to deposit a detection material on a concavo-convex patterned recording layer. Immediately after etching reaches the detection material and a component removed from and flying off the detection material starts to be detected, or alternatively, immediately after the component of the detection material once detected has disappeared, the etching may be stopped. This should allow for removal of the excess part of filling material without etching of the recording elements.

However, in the period immediately after the detection material has first started to be scattered, only a small amount of a component flying from the detection material is available. Thus, the secondary-ion mass spectrometry or quadrupole mass spectrometry sometimes cannot readily detect the exact point in time at which the etching has reached the detection material because the difference between noise and data indicative of the component of the detection material starting to be detected cannot be clearly is known.

Conversely, it is relatively easy to determine that the detection material once detected has substantially disappeared. However, the secondary-ion mass spectrometry and quadrupole mass spectrometry are intended to detect a component removed from and flying off the detection material. Thus, there will be a time lag between the point in time at which the detection material has actually been completely removed from the workpiece and the point in time at which the detection material is determined to have disappeared.

Accordingly, when the etching is stopped immediately after the detection material is determined to have disappeared, the detection material may have actually already been completely removed from the workpiece and the etching has proceeded further to etch the recording elements.

Furthermore, when the recording elements are etched, the filling material that fills the concave portions between the recording elements is also etched. Since the recording element and the filling material are formed of different materials and thus have different etching rates in general, the filling material in the concave portion may be etched further in conjunction with the recording element, thereby causing a several-nanometer step height between the top surface of the recording elements and the top surface of the filling material. Since discrete track media or patterned media of high areal densities are expected to have a flying height of the head as small as about 5 to 15 nm, even a several-nanometer step height could cause a problem such as a head crash. Incidentally, such a several-nanometer step height would also be produced in semiconductor manufacturing processes. However, semiconductors would never be subjected to such problems as head crashes and thus several-nanometer step heights are not generally problematic for them.

SUMMARY OF THE INVENTION

In view of the foregoing problems, various exemplary embodiments of this invention provide a method for manufacturing magnetic recording media, by which a magnetic recording medium that has a recording layer formed in a concavo-convex pattern, a sufficiently flat surface, and good recording/reproducing properties can be manufactured.

Various exemplary embodiments of the present invention achieve the aforementioned object by a method including the steps of: depositing a first filling material over a workpiece to cover recording elements, the workpiece having a recording layer with the recording elements formed as convex portions of a concavo-convex pattern, and to fill at least part of a concave portion between the recording elements with the first filling material; depositing a detection material over the first filling material; depositing a second filling material over the detection material; and irradiating a surface of the workpiece with a process gas to remove at least part of a deposited portion above the top surfaces of the recording elements to flatten the surface, the deposited portion including any of the first filling material, the detection material, and the second filling material. In the flattening step, a component of the detection material removed from and flying off the workpiece is detected, and irradiation with the process gas is stopped based on a result of detecting the component of the detection material.

Since the first filling material is deposited between the recording elements and the detection material, the first filling material can protect the recording elements against etching even when the detection material above the recording elements has been fully removed and the etching has proceeded further.

When the first filling material is deposited in a thickness greater than the depth of the concave portion, etching may proceed further after the detection material above the recording elements has been fully removed. This may cause the first filling material in the concave portion between the recording elements to be etched in conjunction with the first filling material over the recording elements. Even in this case, only the first filling material is etched both over the recording elements and over the concave portion, thus causing no step heights that would be produced if the recording elements and the filling material were etched in conjunction.

It is noted that if the deposited first filling material is thinner than the depth of the concave portion, the upper portion of the concave portion is filled with the second filling material. Then, when etching proceeds further after the detection material over the recording elements has been fully removed, the second filling material in the concave portion is etched in conjunction with the first filling material over the recording elements. In this case, the same material or materials that have similar etching rates for dry etching in the flattening step may be selected as the first filling material and the second filling material, thereby hardly causing step heights that would be produced if the recording elements and the filling material were etched in conjunction, and thus allowing the surface to be sufficiently flattened.

Moreover, dry etching serves not only to selectively remove convex portions faster than concave portions but also to remove the edge portions of each convex portion faster than the central portion, thus allowing the detection material over the recording elements to be removed gradually from the edge portions. Accordingly, when the recording element is wider, there will be a bigger difference between the point in time at which the etching reaches the detection material over the central portion of the recording element and the point in time at which the etching reaches the detection material over the edge portion of the recording element. This in turn causes variations in the time at which the amount of scattered detection material increases sufficiently to be clearly distinguished from noise. Thus, in some cases it may be difficult to stop etching precisely at the target point.

In contrast to this, there is only a small difference between the point in time at which the etching reaches the detection material over the central portion of the concave portion and the point in time at which the etching reaches the detection material over the edge portion of the concave portion. Consequently, a reduced variation occurs in the time at which the amount of scattered detection material increases sufficiently to be clearly distinguished from noise. Accordingly, the first filling material may be deposited in a thickness equal to or greater than the depth of the concave portion and thereafter the detection material may be deposited. Then, the etching in the flattening step may be stopped based on a result of detecting a component of the detection material removed from and flying off a part of the detection material over the concave portion, thereby making it possible to stop etching precisely at the target point.

Accordingly, various exemplary embodiments of this invention provide a method for manufacturing a magnetic recording medium, comprising a first filling material deposition step of depositing a first filling material over a workpiece to cover recording elements, the workpiece having a substrate and a recording layer formed in a predetermined concavo-convex pattern over the substrate with the recording elements formed as convex portions of the concavo-convex pattern, and to fill at least part of a concave portion between the recording elements with the first filling material; a detection material deposition step of depositing a detection material over the first filling material; a second filling material deposition step of depositing a second filling material over the detection material; and a flattening step of irradiating a surface of the workpiece with a process gas to remove at least part of a deposited portion above the top surfaces of the recording elements to flatten the surface, the deposited portion including any of the first filling material, the detection material, and the second filling material, wherein these steps are carried out in that order, and in the flattening step, a component of the detection material removed from and flying off the workpiece is detected to stop irradiation with the process gas based on a result of detecting the component of the detection material.

Note that as used herein, the expression or the term "the recording layer formed in a predetermined concavo-convex pattern with the recording elements formed as convex portions of the concavo-convex pattern" may refer to one which is obtained by dividing a continuous recording layer into a number of recording elements in a predetermined pattern. In addition to this, the term also includes recording layers which are formed over parts of the substrate, such as those in which track-shaped recording elements are joined at their edge portions or in which a recording element is formed in a spiral scroll shape. The term further includes a recording layer which has the concave portion formed partway through its thickness with the surface on the substrate side being continuous; a continuous recording layer which is formed to follow the surface of a substrate or an underlying layer having a concavo-convex pattern; and a recording layer which is divided into sections formed on the top surface of convex portions and sections formed on the bottom surface of concave portions of a substrate or an underlying layer having a concavo-convex pattern.

Furthermore, as used herein, the expression or the term "the top surfaces of the recording elements" refers to a surface of the recording layer opposite to the substrate.

Furthermore, as used herein, the expression or the term "magnetic recording media" refers to, but is not limited to, hard disks, floppy (registered trademark) disks, or magnetic tapes which employ only magnetism for recording/reproducing of information, as well as magneto-optical recording media such as MOs (Magneto Optical) which employ both magnetism and beams of light, and heat-assisted recording media which employ both magnetism and heat.

According to the present invention, it is possible to manufacture a magnetic recording medium which has a recording layer formed in a concavo-convex patterned, a sufficiently flat surface, and good recording/reproducing properties.

DETAILED DESCRIPTION OF THE PREFERRED EMBODIMENTS

Various exemplary embodiments of the present invention will be explained below in detail with reference to the drawings.

Figure 1:
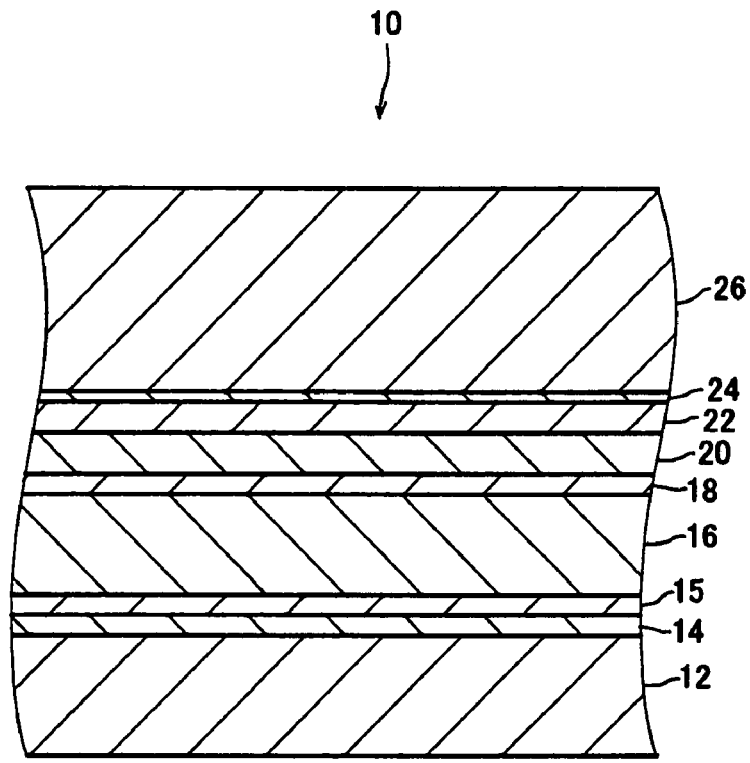
FIG. 1 is a schematic cross-sectional side view showing the structure of a starting body of a workpiece according to a first exemplary embodiment of the present invention.
Figure 2:
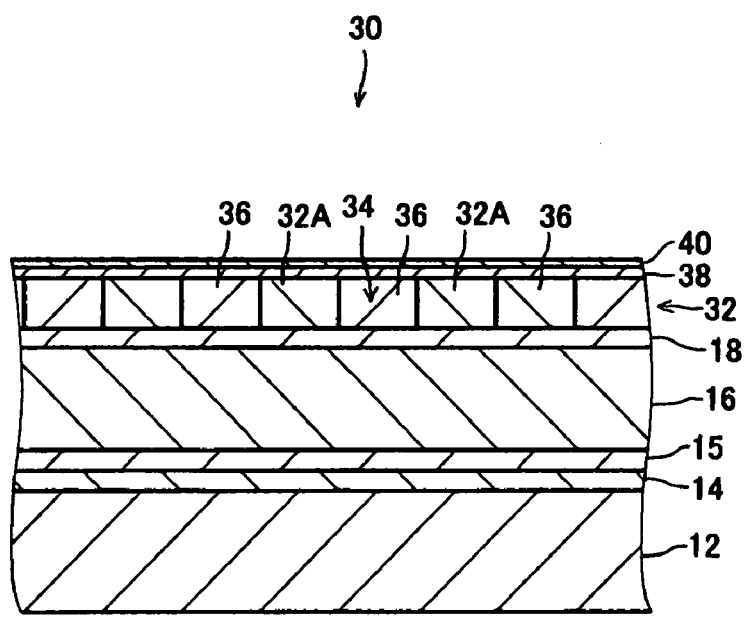
FIG. 2 is a schematic cross-sectional side view showing the structure of a magnetic recording medium that is obtained by processing the workpiece.

A first exemplary embodiment of the present invention relates to a method for manufacturing a magnetic recording medium 30. The method includes the steps of processing a starting body of a workpiece 10, which has a continuous recording layer 20 or the like over a substrate 12 as shown in FIG. 1, thereby dividing the continuous recording layer 20 into a number of recording elements 32A as shown in FIG. 2 to form a recording layer 32 in a predetermined concavo-convex pattern. The method further includes the steps of depositing a first filling material 36 or the like over the recording layer 32 to fill a concave portion 34 between the recording elements 32A with the first filling material 36, and removing an excess part of the first filling material 36 or the like above the top surfaces of the recording elements 32A to flatten the surface. The method is characterized by the step of removing an excess part of the first filling material 36 or the like to flatten the surface. The other steps are thought not to be essential to the understanding of the first exemplary embodiment and thus will be omitted in the following descriptions as appropriate.

The starting body of the workpiece 10 shown in FIG. 1 is configured to have an underlayer 14, an antiferromagnetic layer 15, a soft magnetic layer 16, a seed layer 18, the continuous recording layer 20, a first mask layer 22, a second mask layer 24, and a resist layer 26, which are formed over the substrate 12 in that order.

The substrate 12 is made of glass, $Al_2O_3$ or the like. The underlayer 14 is 2 to 40 nm in thickness and made of Ta or the like. The antiferromagnetic layer 15 is 5 to 50 nm in thickness and made of a PtMn alloy, a RuMn alloy or the like. The soft magnetic layer 16 is 50 to 300 nm in thickness and made of an Fe alloy or a Co alloy. The seed layer 18 is 2 to 40 nm in thickness, and made of a non-magnetic CoCr alloy, Ti, Ru, a multilayer of Ru and Ta, MgO or the like.

The continuous recording layer 20 is 5 to 30 nm in thickness and made of a CoCr alloy. The first mask layer 22 is 3 to 50 nm in thickness and made of C (carbon). The second mask layer 24 is 1 to 30 nm in thickness and made of Ni. The resist layer 26 is 30 to 300 nm in thickness and made of resin.

The magnetic recording medium 30 is a perpendicular recording type discrete track medium.

The recording elements 32A of the recording layer 32 are formed in many concentric arcuate tracks shape in a data area, spaced radially at minute intervals. Note that the recording elements 32A in a servo area are formed in a predetermined servo pattern including contact holes.

As the first filling material 36, a non-magnetic oxide such as $SiO_2$ can be used.

Over the recording elements 32A and the first filling material 36, a protective layer 38 and a lubricant layer 40 are formed in that order. The protective layer 38 is made of hard carbon film that is referred to as diamond-like carbon. The lubricant layer 40 is made of PFPE (perfluoro-polyether).

Figure 3:
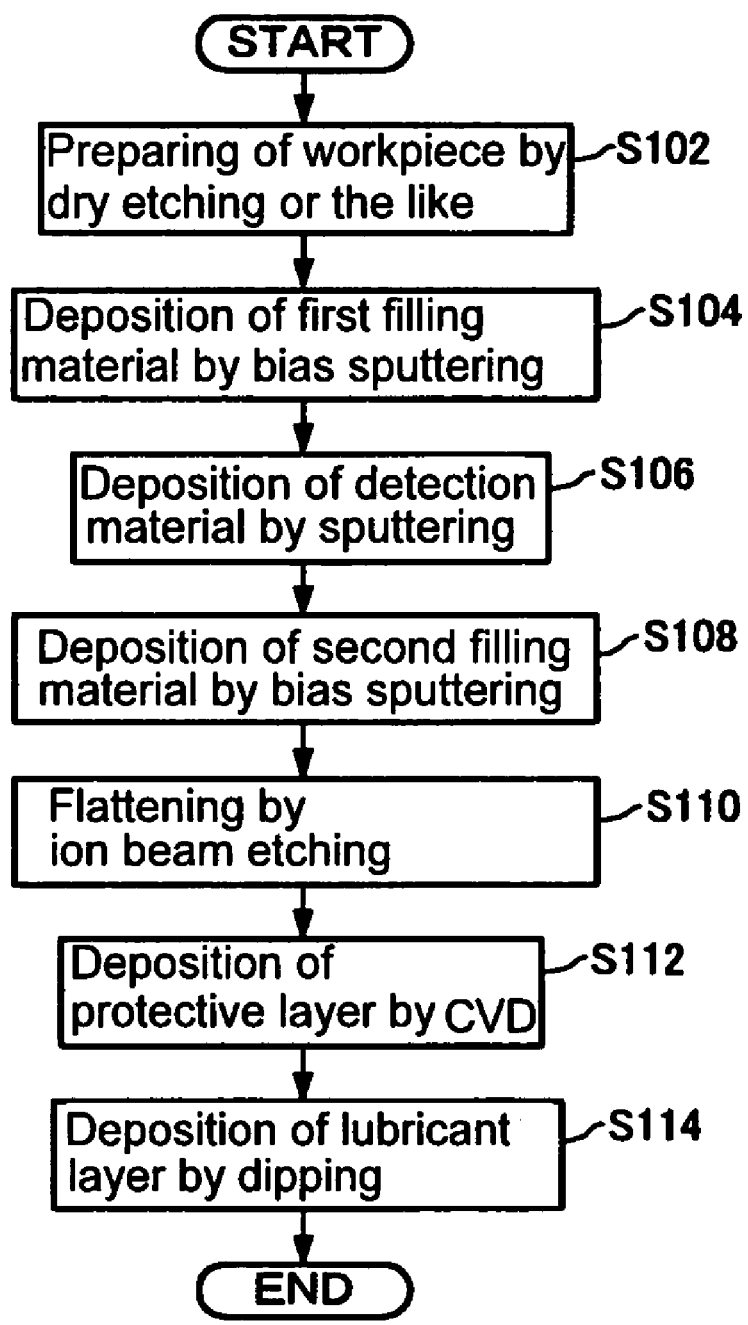
FIG. 3 is a flowchart showing the outline of the manufacturing steps of the magnetic recording medium.

Now, referring to the flowchart shown in FIG. 3, a method for manufacturing the magnetic recording medium 30 will be described.

To begin, the step of manufacturing a workpiece is carried out (S102). More specifically, the starting body of the workpiece 10 shown in FIG. 1 is processed to manufacture the workpiece 10, shown in FIG. 5, which has the recording layer 32 formed in a concavo-convex pattern over the substrate 12 with the recording elements 32A formed as convex portions of the concavo-convex pattern.

The starting body of the workpiece 10 can be obtained as follows. That is, the underlayer 14, the antiferromagnetic layer 15, the soft magnetic layer 16, the seed layer 18, the continuous recording layer 20, the first mask layer 22, and the second mask layer 24 are formed by sputtering in that order over the substrate 12, and then the resist layer 26 is further formed by spin coating.

Figure 4:
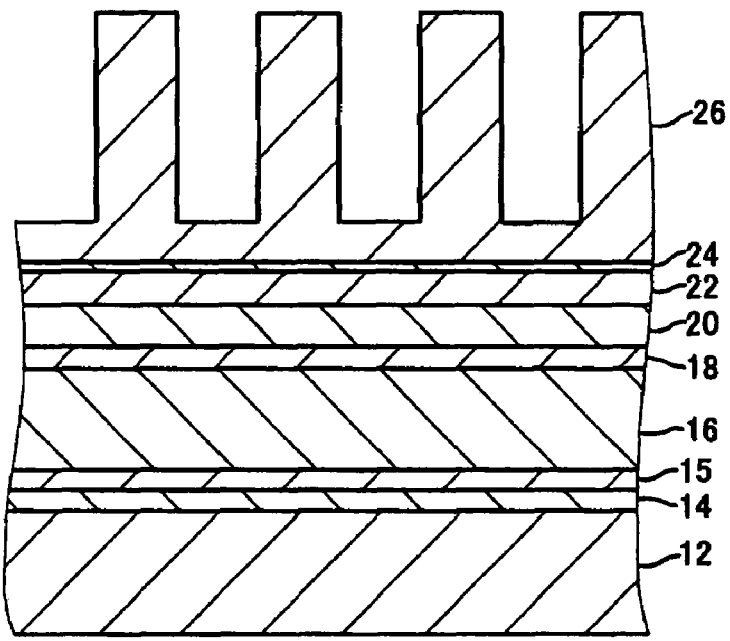
FIG. 4 is a schematic cross-sectional side view showing a concavo-convex pattern transferred to a resist layer of the starting body of the workpiece.

A stamper (not shown) is then used to transfer a concavo-convex pattern corresponding to the concavo-convex pattern of the recording layer 32 onto the resist layer 26 of the starting body of the workpiece 10 by nano-imprinting, as shown in FIG. 4. Then, the resist layer 26 at the bottom of the concave portion is removed by reactive ion beam etching with an $O_2$ or $O_3$ gas employed as the reactive gas. Note that the resist layer 26 may be exposed and developed to process the resist layer 26 into a concavo-convex pattern.

Then, the second mask layer 24 under the bottom of the concave portion is removed by ion beam etching using an Ar gas. Furthermore, the first mask layer 22 under the bottom of the concave portion is removed by reactive ion etching using a $SF_6$ gas. Then, the continuous recording layer 20 under the bottom of the concave portion is removed by ion beam etching using an Ar gas, and the continuous recording layer 20 is divided into a number of recording elements 32A. Note that the first mask layer remaining on the recording elements 32A is removed by reactive ion etching using a $SF_6$ gas.

Figure 5:
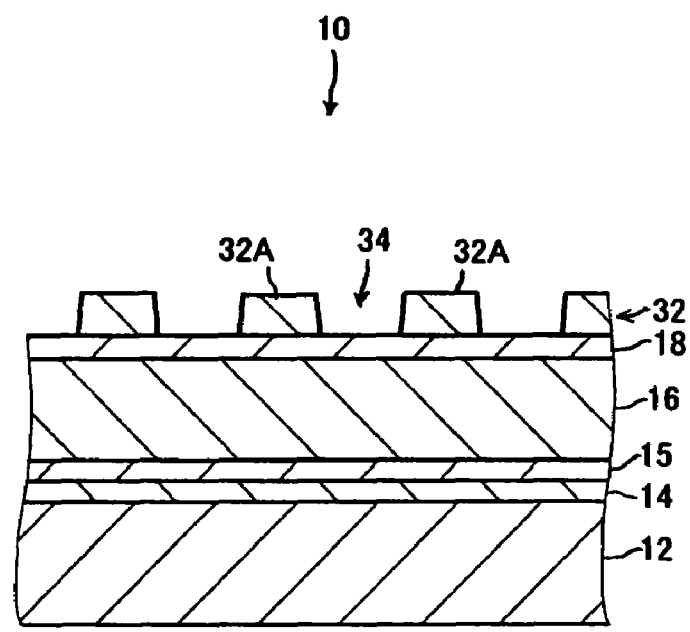
FIG. 5 is a schematic cross-sectional side view showing the shape of the workpiece with a continuous recording layer being divided.

In this manner, a workpiece 10 as shown in FIG. 5 is obtained which has the substrate 12 and the recording layer 32 formed in a concavo-convex pattern over the substrate 12 with the recording elements 32A formed as the convex portions of the concavo-convex pattern.

Figure 6:
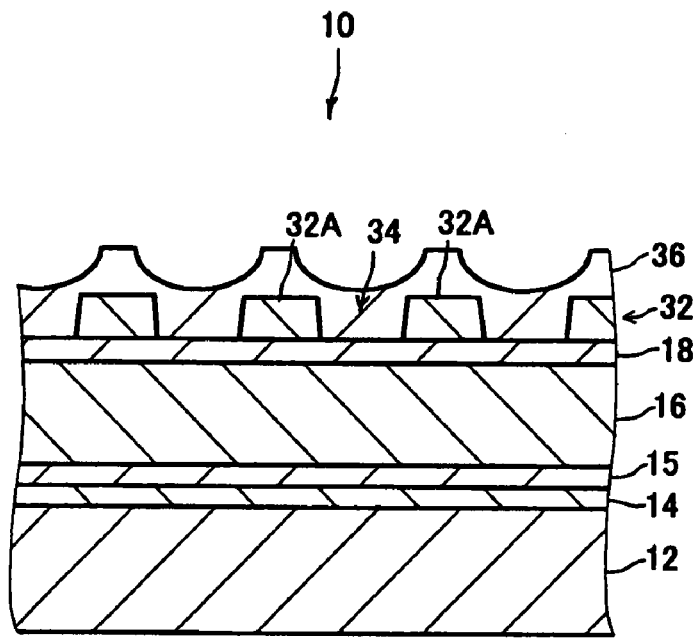
FIG. 6 is a schematic cross-sectional side view showing the workpiece with first filling material deposited.

Then, the first filling material deposition step is carried out (S104). More specifically, as shown in FIG. 6, the first filling material 36 is deposited by bias sputtering over the recording layer 32 in a thickness greater than the depth of the concave portion 34 (in the thickness at the concave portion 34) so as to cover the recording elements 32A as well as fully fill the concave portion 34. The thickness of the first filling material 36 is preferably 0 to 10 nm greater than the depth of the concave portion 34. The particles of the first filling material 36 tend to uniformly deposit on the surface of the workpiece 10, thus making the concavo-convex surface. However, applying a bias voltage to the workpiece 10 causes the sputtering gas to be forced towards the workpiece 10 and irradiated to the first filling material 36 that has been deposited, thereby etching part of the already deposited first filling material 36. Since this etching effect tends to selectively remove edge portions of a projecting portion of the deposited first filling material 36 faster than the other portion (the surrounding non-projecting portion), the convex portion of the surface over the recording elements 32A is reduced in width relative to the recording elements 32A. The deposition has a greater effect than the etching, which allows the deposition to proceed while mitigating the recesses and protrusions on the surface. As such, in a shape with mitigated recesses and protrusions on the surface, the first filling material 36 is deposited to cover the recording elements 32A.

Figure 7:
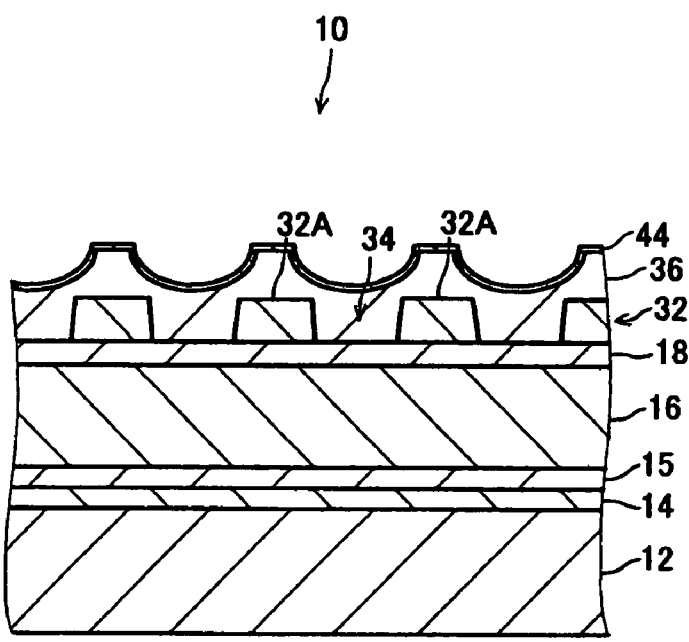
FIG. 7 is a schematic cross-sectional side view showing the workpiece with a detection material deposited.

Then, the detection material deposition step is carried out (S106). More specifically, as shown in FIG. 7, a detection material 44 is deposited over the first filling material 36 by sputtering. The detection material 44 can be formed by depositing a non-oxide, such as Nb, which includes an element different from the elements that constitute the recording layer 32, the first filling material 36, and second filling material 45. The detection material 44 is uniformly deposited across the recesses and protrusions on the surface of the first filling material 36. Note that according to the first exemplary embodiment, the detection material 44 is so deposited as to fully cover the first filling material 36. In consideration of the efficiency of manufacture, the detection material 44 has a thickness of preferably 5 nm or less.

When a non-oxide such as Nb is brought into contact with the first filling material 36 which is an oxide, its lower surface is oxidized due to diffusion of oxygen in the first filling material 36.

Figure 8:
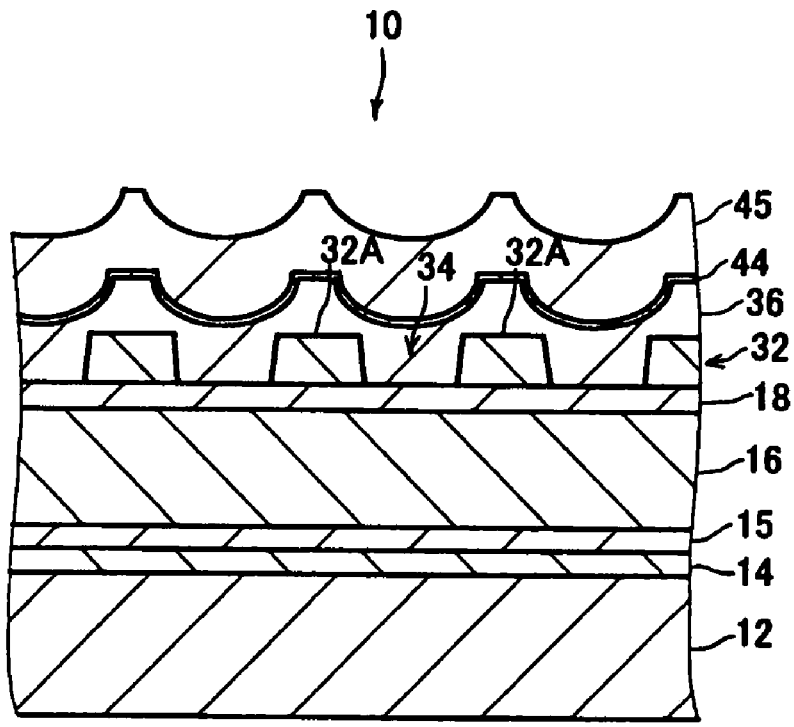
FIG. 8 is a schematic cross-sectional side view showing the workpiece with second filling material deposited.
Figure 9:
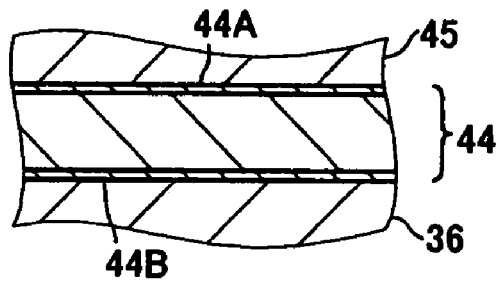
FIG. 9 is an enlarged schematic cross-sectional side view showing the structure of the detection material.

Next, the second filling material deposition step is carried out (S108). More specifically, as in the first filling material deposition step (S104), the second filling material 45 is deposited over the detection material 44 by bias sputtering, as shown in FIG. 8. Like the first filling material 36, a non-magnetic oxide such as $SiO_2$ can be used as the second filling material 45. Deposition of the second filling material 45 which is an oxide in contact with the top surface of the detection material 44 will allow oxygen in the second filling material 45 to diffuse into the top surface of the detection material 44, causing the top surface portion of the detection material 44 to be oxidized. That is, as shown in FIG. 9 in an enlarged view, the detection material 44 is oxidized near an upper face 44A and a lower face 44B.

Figure 10:
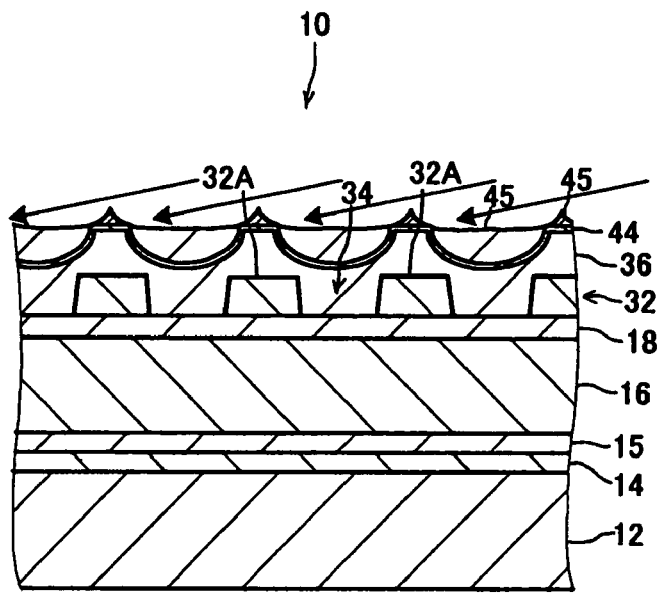
FIG. 10 is a schematic cross-sectional side view showing the workpiece in which etching has reached the detection material on the recording element in a flattening step.

Next, the flattening step is carried out (S110). More specifically, as shown with arrows in FIG. 10, using ion beam etching, the workpiece 10 is irradiated with a process gas such as an Ar gas at an angle relative to normal to the surface thereof to remove a deposited portion above the top surface of the recording elements 32A (the surface opposite to the substrate 12). Here, the deposited portion can include the first filling material 36, the detection material 44, and the second filling material 45. Such irradiation of the workpiece 10 with a process gas at an angle relative to normal to the surface thereof will probably cause convex portions to be removed faster than concave portions.

At this time, control is provided to the ion beam etching while a component of the detection material 44 removed from and flying off the workpiece 10 is being detected by secondary-ion mass spectrometry, quadrupole mass spectrometry or the like.

Immediately after the detection material 44 has just started to scatter, only a small amount of a component flying off the detection material 44 is available, and thus the difference between noise and data indicative of the detected component of the detection material 44 may not be clear.

Furthermore, dry etching such as ion beam etching serves not only to selectively remove a convex portion faster than a concave portion but also to remove edge portions of a convex portion faster than a central portion thereof, thus causing the detection material 44 over the recording elements 32A to be removed gradually from the edge portions. The wider the recording elements 32A are, the bigger the difference between the point in time at which the etching reaches parts of the detection material 44 over the central portion of the recording elements 32A and the point in time at which the etching reaches other parts of the detection material 44 over the edge portion of the recording elements 32A. This in turn causes variations in the time at which the amount of scattered detection material 44 increases sufficiently to be clearly distinguished from noise. Accordingly, if the recording elements 32A are wide, it is difficult to stop etching at the target point with high accuracy when stopping irradiation with the process gas based on detection of a component removed from and flying off parts of the detection material 44 over the recording elements 32A.

Figure 11:
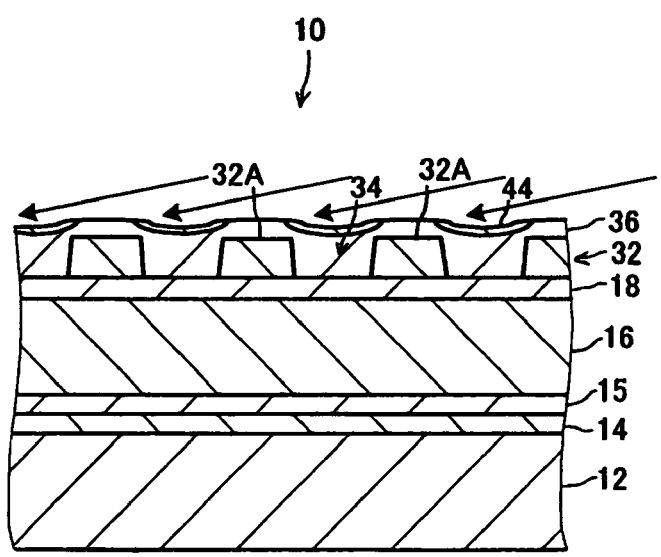
FIG. 11 is a schematic cross-sectional side view showing the workpiece in which etching has reached the detection material over the concave portion in the flattening step.

In contrast to this, when the etching further proceeds to expose the detection material 44 over the concave portions 34 as shown in FIG. 11, most of the detection material 44 over the concave portions 34 is etched at the same time irrespective of the width of the concave portions 34. Thus, only a small variation exists in the time at which the amount of scattered detection material 44 increases sufficiently enough to be clearly distinguished from noise. Accordingly, irradiation with the process gas can be stopped based on detection of a component removed from and flying off parts of the detection material 44 over the concave portions 34, thereby allowing the etching to be stopped at the target point with high accuracy.

Figure 12:
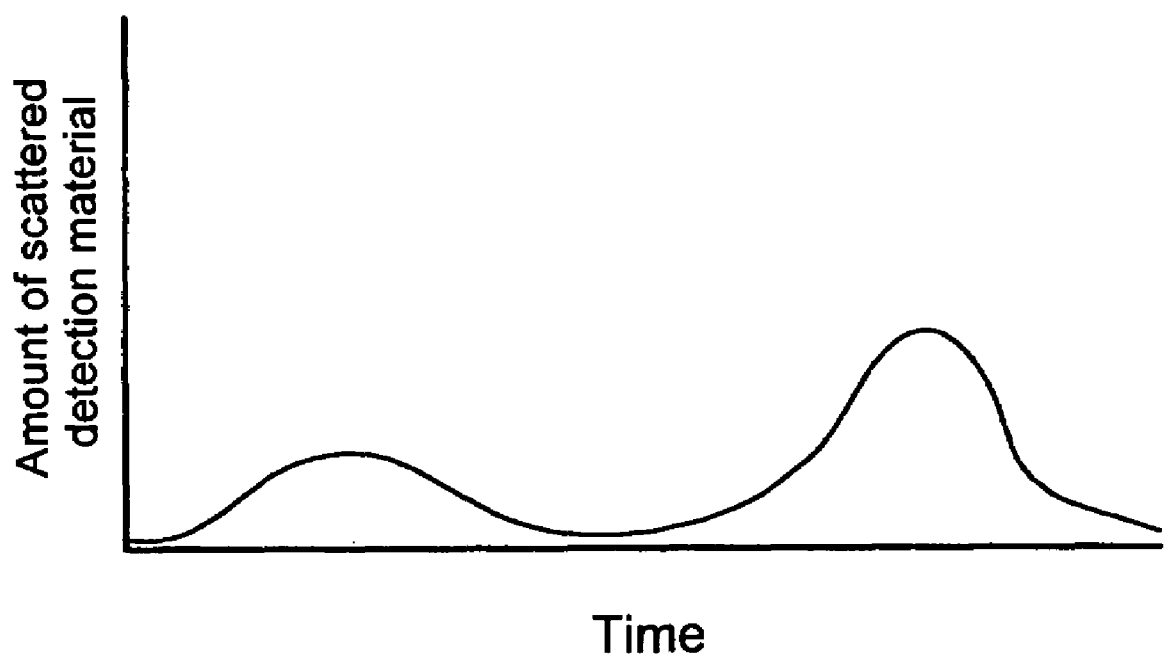
FIG. 12 is a graph schematically showing a relation between time and amount of scattered detection material in the flattening step.

As shown in FIG. 12, the amount of scattered detection material 44 gradually increases after the etching is started, and then temporarily decreases after the parts of the detection material 44 over the recording elements 32A are removed. The amount of scattered detection material 44 increases again when the etching reaches the parts of the detection material 44 over the concave portions 34, and then decreases rapidly after the parts of the detection material 44 over the concave portion 34 are removed. Accordingly, based on the increase or decrease in the amount of scattered detection material 44 in the latter part of the process, it is possible to detect that the etching has reached the parts of the detection material 44 over the concave portion 34.

In the first exemplary embodiment, based on a result of detecting a component of the detection material 44 removed from and flying off the parts of the detection material 44 over the concave portions 34, the irradiation with the process gas is stopped, thereby stopping the etching. For example, suppose that the etching has reached the parts of the detection material 44 over the concave portions 34 to yield the maximum value for the detected amount of a component of the detection material 44, and the etching then proceeds further until that the detection material 44 is determined to have substantially disappeared. At that point in time, irradiation with the process gas is stopped, thereby stopping the etching.

Alternatively, based on a predefined reference value for the detected amount of a component of the detection material 44, the irradiation with the process gas may be stopped when the detected amount has reached the reference value. Alternatively, irradiation with the process gas may be stopped after a certain period of time has elapsed from that point in time.

Note that the secondary-ion mass spectrometry or the quadrupole mass spectrometry detects a larger amount of an element constituting a detection material when an oxide of the element is being etched than when the single element is being etched. In the first exemplary embodiment, the second filling material 45 is an oxide and the detection material 44 is oxidized near the top surface 44A, thereby facilitating detection of the point in time at which the detection material 44 starts to scatter. Furthermore, the first filling material 36 is also an oxide and the detection material 44 is oxidized also near the lower face 44B, thereby facilitating the detection of the point in time at which the detection material 44 disappears.

As such, the detection material 44 is preferably 3 nm or more in thickness in order to oxidize the detection material 44 only near the upper face 44A and the lower face 44B. Note that if the detection material 44 is oxidized only near the upper face 44A and the lower face 44B, the amount of scattered detection material 44 increases and decreases twice when the parts of the detection material 44 over the recording elements 32A are etched and when the parts of the detection material 44 over the concave portions 34 are etched respectively. Thus, the amount of scattered detection material 44 increases and decreases three to four times in total in some cases. Even so, it is easy to distinguish between an increase or decrease in the amount of scattered detection material 44 when the parts of the detection material 44 over the recording elements 32A are etched and an increase or decrease in the amount of scattered detection material 44 when the parts of the detection material 44 over the concave portions 34 are etched. It is thus possible to detect that the etching has reached the parts of the detection material 44 over the concave portions 34.

On the other hand, for example, the detection material 44 may be deposited to be thinner than 1 nm. In this case, the detected amount of a component of the detection material 44 takes on a maximal (maximum) value only once in the latter part of the process where the parts of the detection material 44 over the concave portions 34 are etched. Thus, the point in time at which the amount of scattered detection material 44 reaches the maximal value can be readily determined.

Note that since secondary-ion mass spectrometry and quadrupole mass spectrometry are intended to detect a removed and scattered substance, there will be a time lag between the point in time at which the substance is actually removed and the point in time at which the substance is detected. Accordingly, even when the etching is stopped based on a result of detecting a component of the detection material 44, the etching may proceed further in practice after the detection material 44 has been fully removed.

However, the first filling material 36 is deposited in a thickness greater than the depth of the concave portion 34, and the lower face of the detection material 44 is located 0 to 10 nm above the top surfaces of the recording elements 32A (the surface opposite to the substrate 12). Thus, the recording elements 32A are protected against etching even when the etching is stopped after the detection material 44 has been fully removed. Note that even in the event of the etching having reached the top surfaces of the recording elements 32A, the processed amount of the recording elements 32A is limited to such a trace amount that it has negligible effects on their magnetic property.

Furthermore, after the detection material 44 has been fully removed, the etching may further proceed to etch the parts of the first filling material 36 in the concave portion 34 in conjunction with the parts of the first filling material 36 over the recording elements 32A. Even in this case, only the first filling material 36 is etched both in the concave portions 34 and over the recording elements 32A, thereby hardly causing step heights that would be produced if the recording elements and the filling material were etched together and thus making the surface sufficiently flat.

The first filling material 36 can be deposited in a thickness greater than the depth of the concave portion 34 by an etching amount of the first filling material 36 underlying the detection material 44 that is etched away before etching stops after the detection material 44 has been fully removed. This allows etching of the top surface of the recording elements 32A to be prevented or limited to such an extent that it has negligible effects on their magnetic property.

Next, the protective layer 38 is deposited by CVD in a thickness of 1 to 5 nm on the top surface of the recording elements 32A and the first filling material 36 (S112). Furthermore, by dipping, the lubricant layer 40 is deposited in a thickness of 1 to 2 nm on the protective layer 38 (S114). In this manner, the magnetic recording medium 30 shown above in FIG. 2 is completed.

Now, description will be made to a second exemplary embodiment of the present invention.

In the first exemplary embodiment, the detection material 44 is deposited to fully cover the first filling material 36 in the detection material deposition step (S106). In contrast to this, the second exemplary embodiment is characterized in that the detection material 44 is scattered over the first filling material 36 and deposited so thinly as not to fully cover the first filling material 36. The other steps are the same as those of the first exemplary embodiment, and thus will be indicated with the same numerical references as those of the first exemplary embodiment without being further described, as appropriate.

Figure 13:
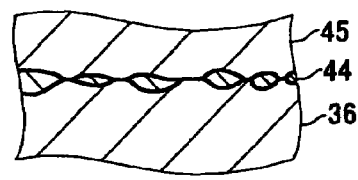
FIG. 13 is a cross-sectional side view schematically showing the structure of a workpiece around a detection material according to a second exemplary embodiment of the present invention.

In this manner, the detection material 44 is scattered over the first filling material 36 and deposited so thinly as not to fully cover the first filling material 36. As shown in FIG. 13, this causes the detection material 44 not to be a continuous film and causes most of the detection material 44 to be oxidized due to oxygen diffused from the first filling material 36 or the second filling material 45. Thus, a larger amount of the detection material 44 is detected.

Furthermore, the first filling material 36 being deposited so thinly as described above allows the detected amount of a component of the detection material 44 to take on a maximal (maximum) value only once in the latter part of the process where the parts of the detection material 44 over the concave portion 34 are etched. This facilitates the determination of the point in time at which the detected amount reaches the maximum value. Furthermore, the detected amount becomes maximal (maximum) only once, thereby also allowing a larger amount of it to be detected.

In this way, a larger amount of the detection material 44 can be detected by secondary-ion mass spectrometry or quadrupole mass spectrometry. Thus, for example, even when the detection material 44 is deposited in a thickness less than 1 nm, it is possible to clearly detect that the etching has reached the detection material 44. To allow a larger amount of the detection material 44 to be detected, the detection material 44 is deposited preferably in a thickness of 0.3 to 1 nm, and more preferably in a thickness of 0.4 to 0.6 nm. Note that it is difficult to actually measure the thickness of the detection material 44 that is deposited as thinly as this, and thus the aforementioned thickness of the detection material 44 is the target thickness derived from the deposit rate and the deposit time.

Now, description will be made to a third exemplary embodiment of the present invention.

Figure 14:
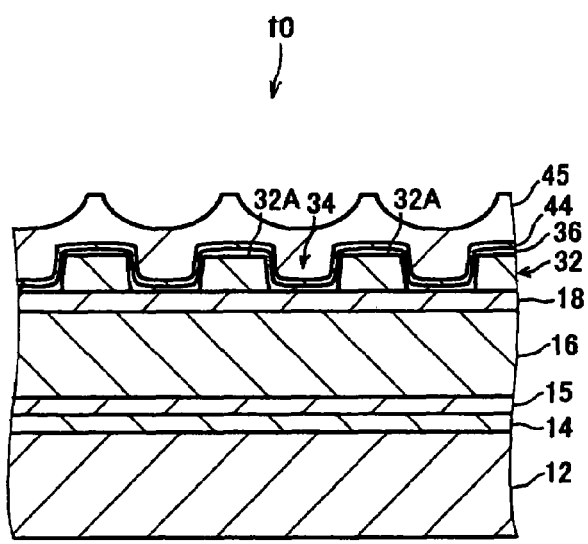
FIG. 14 is a schematic cross-sectional side view showing a workpiece with a first filling material, a detection material, and a second filling material deposited according to a third exemplary embodiment of the present invention.

According to the first exemplary embodiment, in the first filling material deposition step (S104), the first filling material 36 is deposited in a thickness greater than the depth of the concave portion 34 over the recording layer 32 to fully fill the concave portion 34 with the first filling material 36. Then, irradiation with the process gas is stopped based on a result of detecting a component of the detection material 44 over the concave portion 34. In contrast to this, as shown in FIG. 14, the third exemplary embodiment is characterized in that the first filling material 36 is deposited over the recording layer 32 in a thickness less than the depth of the concave portion 34. Then, irradiation with the process gas is stopped based on a result of detecting a component of the detection material 44 over the recording elements 32A. Note that the concave portion 34 is filled with the first filling material 36, the detection material 44, and the second filling material 45.

The other steps are the same as those of the first exemplary embodiment, and thus will be indicated with the same numerical references as those of the first exemplary embodiment without being further described, as appropriate.

Figure 15:
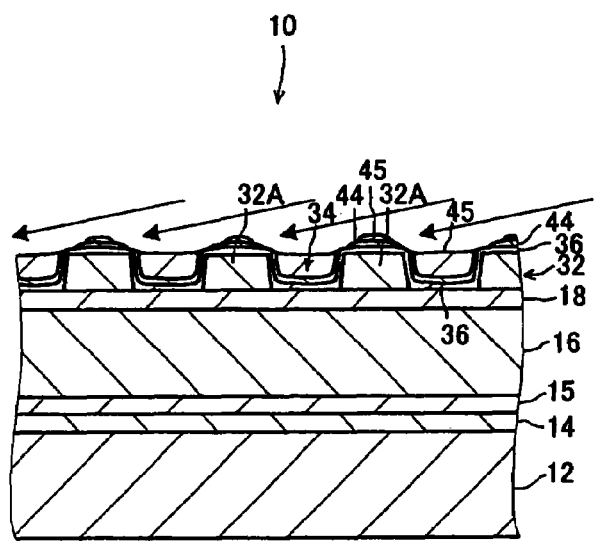
FIG. 15 is a schematic cross-sectional side view showing the workpiece in which etching has reached the detection material over the recording elements in the flattening step.

According to the third exemplary embodiment, at the point in time at which the etching has reached the parts of the detection material 44 over the recording elements 32A in the flattening step (S110) as shown in FIG. 15, a component removed from and flying off the detection material 44 is detected, thereby stopping the etching. That is, the etching is stopped upon detecting that the etching has reached the parts of the detection material 44 over the recording elements 32A.

According to the third exemplary embodiment, the first filling material 36 is also deposited between the recording elements 32A and the detection material 44. Thus, even when the etching proceeds further after the parts of the detection material 44 over the recording elements 32A have been fully removed, the recording elements 32A can be protected against etching by the first filling material 36.

Furthermore, in the third exemplary embodiment, after the parts of the detection material 44 over the recording elements 32A have been fully removed, the etching may further proceed to etch the parts of the first filling material 36 over the recording elements 32A and the second filling material 45 filling in the concave portion 34. Even in this case, only $SiO_2$ (the first filling material 36 and the second filling material 45) is etched both over the recording elements 32A and in the concave portions 34, thereby hardly causing step heights that would be produced if the recording elements and the filling material were etched together and thus making the surface sufficiently flat.

Furthermore, in the third exemplary embodiment, the detection material 44 which is a non-oxide material is also oxidized near the upper face 44A and the lower face 44B due to oxygen diffused from the first filling material 36 or the second filling material 45. This allows a larger amount of the detection material 44 to be detected by secondary-ion mass spectrometry and quadrupole mass spectrometry, thereby making it possible to detect that the etching has reached the detection material 44.

As with the second exemplary embodiment, the third exemplary embodiment may also be adapted such that in the detection material deposition step (S106), the detection material 44 is scattered over the first filling material 36 and deposited to be so thin as not to fully cover the first filling material 36.

Note that in the first to third exemplary embodiments, Nb is employed as the detection material 44 by way of example; however, for example, other elements such as Al, Y, Zr, Rh, Ag, Tb, Ta, Au, Bi, Ti, In, or W may also be employed as the detection material. The detection material 44 may be formed of a single element different from elements constituting the recording layer 32, or alternatively may be formed of a plurality of elements selected from the group consisting of these elements and Nb. Furthermore, for example, an oxide of these elements or Nb may also be employed as the detection material. As such, an oxide may be used as the detection material, thereby making it possible for a larger amount to be detected by secondary-ion mass spectrometry and quadrupole mass spectrometry. Metal elements having a larger atomic number such as Nb, which can be detected relatively easily by secondary-ion mass spectrometry and quadrupole mass spectrometry, are deposited more easily in a non-oxidized state than in an oxidized state. Accordingly, as in the first to third exemplary embodiments, an oxide may be preferably used as at least one of the first filling material and the second filling material, so that the detection material is oxidized due to oxygen diffused from the first filling material or the second filling material. Note that even when part or all of the detection is material 44 is oxide, the scattered detection material 44 is detected based on the mass number of the single element. With regard to Zr, Ag, Ta, Ti, In, and W, the scattered detection material 44 is preferably detected based on the mass number of the isotope of the highest abundance in nature among a plurality of isotopes thereof.

In the first to the third exemplary embodiment, both the first filling material 36 and the second filling material 45 are $SiO_2$. However, different oxides may also be used as the first filling material 36 and the second filling material 45. Moreover, a non-oxide may also be used as either the first filling material 36 or the second filling material 45. Furthermore, both the first filling material 36 and the second filling material 45 may also be a non-oxide. When the second filling material fills the upper portion of the concave portion 34 as in the third exemplary embodiment, the first filling material 36 and the second filling material 45 are preferably formed of materials that have close etching rates for the etching in the flattening step (S110).

Note that in the third exemplary embodiment, the second filling material 45 fills the concave portion 34, whereas in the first and second exemplary embodiments, the first filling material 36 is deposited in a thickness greater than the depth of the concave portion 34 and the second filling material 45 does not fill the concave portion 34. However, it is to be understood that for convenience the term "the second filling material" is still used herein in this case.

Furthermore, in the first to third exemplary embodiments, ion beam etching using an Ar gas is presented by way of example for the dry etching in the flattening step (S110); however, such ion beam etching using another rare gas such as Kr or Xe may also be employed. Alternatively, for example, other dry etching methods can also be used including reactive ion etching using a halogen containing reactive gas such as $SF_6$, $CF_4$, or $C_2F_6$, or reactive ion beam etching using a gas mixture of a reactive gas and a rare gas.

Furthermore, in the first to third exemplary embodiments, secondary-ion mass spectrometry and quadrupole mass spectrometry are presented by way of example as a method for detecting a component of the detection material 44 removed from and flying off the workpiece 10 in the flattening step (S110). However, another method may also be employed so long as the method can highly accurately detect a component of the detection material 44 removed from and flying off the workpiece 10.

Furthermore, in the first to third exemplary embodiments, the first filling material 36 and the second filling material 45 are deposited by bias sputtering; however, the first filling material 36 and the second filling material 45 may also be deposited using other deposition methods such as the sputtering method in which no bias power is applied, the CVD method, or the IBD method.

Furthermore, in the first to third exemplary embodiments, only the flattening step (S110) is intended to flatten the surface of the workpiece 10. However, for example, another layer may also be deposited on the workpiece after the flattening step (S110) and then further flattened by dry etching or the like.

In the first to third exemplary embodiments, the continuous recording layer 20 (the recording elements 32A) is formed of a CoCr alloy; however, for example, another alloy containing an iron group element (Co, Fe, Ni), or another material such as a multilayer of them may also be used.

Furthermore, in the first to third exemplary embodiments, under the continuous recording layer 20 are the underlayer 14, the antiferromagnetic layer 15, the soft magnetic layer 16, and the seed layer 18; however, the structure of the layers underlying the continuous recording layer 20 may be changed as appropriate according to the type of the magnetic recording medium. For example, one or more of the underlayer 14, the antiferromagnetic layer 15, the soft magnetic layer 16, and the seed layer 18 may be eliminated. Furthermore, the continuous recording layer may be formed directly on the substrate.

Furthermore, in the first to third exemplary embodiments, the magnetic recording medium 30 has the recording layer 32 and the like formed only on one side of the substrate 12; however, the present invention is also applicable to the manufacture of a double side recording magnetic recording medium that has a recording layer on both sides of the substrate.

Furthermore, in the first to third exemplary embodiments, the magnetic recording medium 30 is a perpendicular recording type discrete track medium in which the recording layer 32 is divided at minute intervals in a radial direction of the tracks. However, as a matter of course, the present invention is also applicable to the manufacture of magnetic disks with the recording layer divided at minute intervals in a circumferential direction of the tracks (along the sectors); patterned media with the recording layer divided at minute intervals both in the radial direction and in the circumferential direction of the tracks; PERM (Pre-Embossed Recording Medium) type magnetic disks having a concavo-convex patterned continuous recording layer; and magnetic disks having a spiral recording layer. The present invention is also applicable to the manufacture of a magnetic recording medium having a longitudinal recording type recording layer. The present invention is also applicable to the manufacture of a magneto-optical disk such as MO; a heat-assisted magnetic disk which employs both magnetism and heat; and a magnetic recording medium having a concavo-convex patterned recording layer with shape other than a disk, such as magnetic tapes.

WORKING EXAMPLE 1

In accordance with the aforementioned first and second exemplary embodiments, nine types of samples A to J were prepared, ten pieces for each type. More specifically, ninety workpieces 10 were first prepared which had a substrate 12 of a diameter of 48 mm and a recording layer 32 with the following concavo-convex patterns.

Track pitch: 150 nm
Width of the convex portion: 90 nm
Width of the concave portion: 60 nm
Step height of concavo-convex pattern (the depth of the concave portion 34): 18 nm
Range of the concavo-convex pattern formed: within the radii of 16 to 18 mm from the center Then, by bias sputtering, the first filling material 36 was deposited on the recording layer 32 of the workpiece 10 in a thickness greater than the depth of the concave portion 34 to thereby fully fill the concave portion 34 with the first filling material 36. The bias sputtering was carried out under the following conditions. Note that the first filling material 36 was $SiO_2$.

Deposition power (power to be applied to $SiO_2$ target): RF 500 W
Bias power to be applied to the workpiece 10: RF 150 W
Pressure in the chamber: 0.3 Pa
Distance between the target and the workpiece: 250 mm
Deposition thickness (the thickness of the first filling material 36 over the concave portion 34): 20 nm Next, by sputtering, Nb was deposited on the first filling material 36 as the detection material 44. The detection material 44 was deposited in different thicknesses for each of A to J. The thickness of the detection material 44 for each of A to J is shown in Table 1. Note that these deposition thicknesses were derived from the deposition rate and time for the deposition of the detection material 44.

Then, by bias sputtering, the second filling material 45 was deposited on the detection material 44 of each of these workpieces 10. The second filling material 45 used was $SiO_2$. The bias sputtering was carried out in the following conditions.

Deposition power (power to be applied to $SiO_2$ target): RF 500 W
Bias power to be applied to the workpiece 10: RF 150 W
Pressure in the chamber: 0.3 Pa
Distance between the target and the workpiece: 250 mm
Deposition thickness (the thickness of the second filling material 45 over the concave portion 34): 40 nm Then, by ion beam etching, excess parts of the first filling material 36, the detection material 44, and the second filling material 45 above the top surface of the recording elements 32A were removed to thereby flatten the surface. The ion beam etching was carried out in the following conditions. Note that the incident angle of the ion beam is an angle to the surface of the workpiece 10.

Incident angle of ion beam: about 2°
Beam voltage: 700 V
Beam current: 1100 mA
Suppressor voltage: 400 V
Ar gas flow rate: 11 sccm
Pressure in the chamber: 0.04 Pa At this time, by secondary-ion mass spectrometry, Nb (a component of the detection material 44) removed from and flying off the workpiece 10 was detected, and the ion beam etching was stopped at the point in time at which the number of counts of Nb substantially disappeared. Here, the number of counts of Nb means the value corresponding to the amount of scattered Nb. Note that the background value of the number of counts of Nb may take on about 2000 (count/sec) due to noise even when only the uppermost surface of the second filling material 45 is being etched. Accordingly, after the number of counts of Nb has become maximal (in the latter part of the process where parts of the detection material 44 over the concave portions 34 are etched), the point in time at which the maximal value was decreased to half was determined as the point in time at which the detection material 44 substantially disappeared. At this point in time, the ion beam etching was stopped. Note that since H and J had two maximal values, the point in time at which the latter maximal value was decreased to half was determined as the point in time at which the detection material 44 substantially disappeared.

Figure 16:
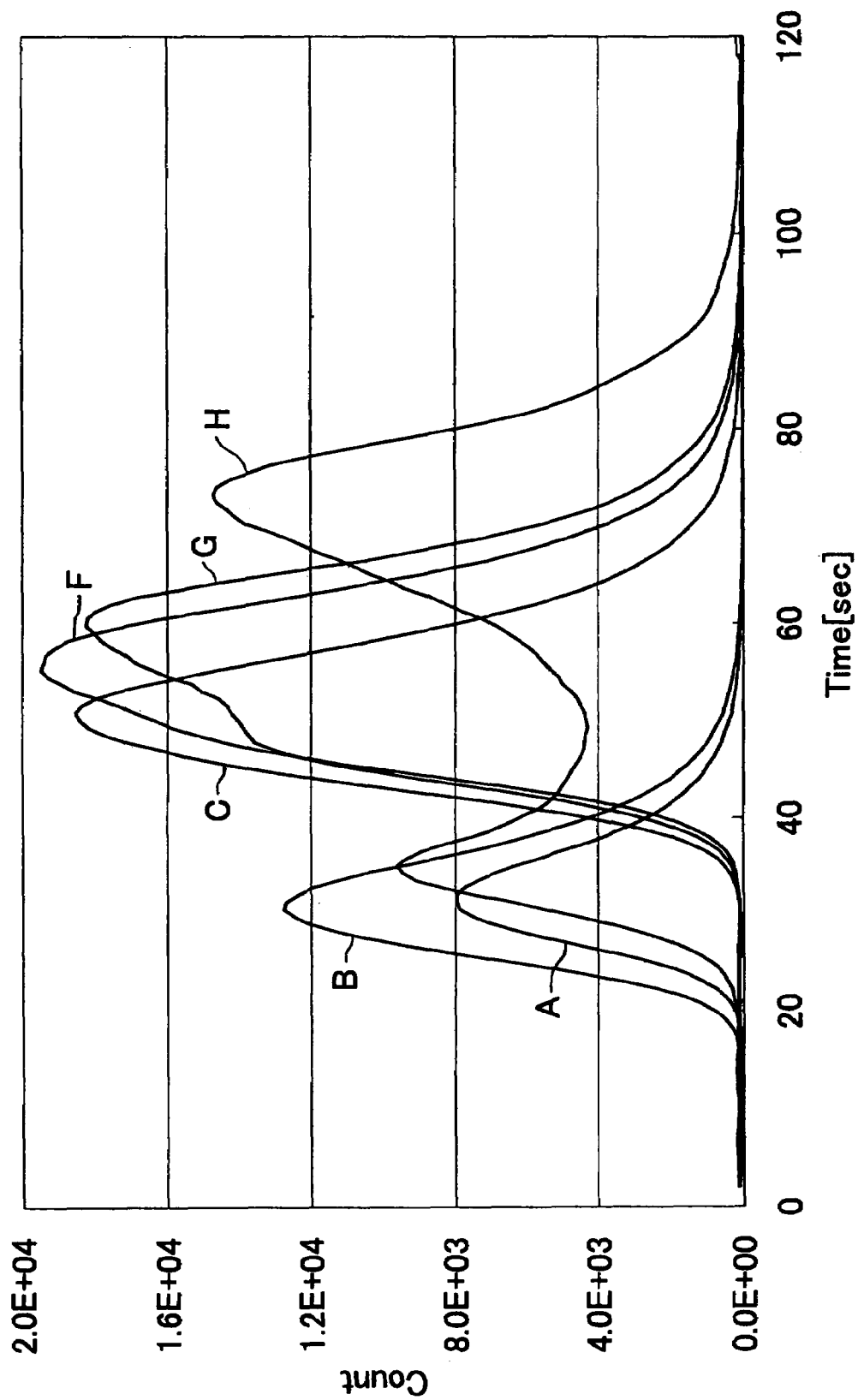
FIG. 16 is a graph showing a relation between time and number of counts of Nb detected in a flattening step according to an Working Example of the present invention.

Table 1 shows the time required to flatten A to J and the maximal value of the number of counts of Nb just before the number of counts of Nb substantially disappeared. FIG. 16 shows the relation between the time and the number of counts of Nb detected in flattening A to C and F to H among A to J. Note that symbols in FIG. 16, A to C and F to H, indicate that the curves labeled with them represent data on A to C and F to H, respectively. Furthermore, in FIG. 16, the point "0" on the horizontal axis is not the point in time at which the flattening process was started by ion beam etching but a point in time just before the point in time at which the parts of the detection material 44 over the concave portions started to be detected. That is, the graph of FIG. 16 shows a state after other parts of the detection material 44 over the recording elements 32A have been removed.

After the flattening process, by AFM (Atomic Force Microscope), the step height between the top surface of the recording element 32A of each of the samples A to J and the top surface of the first filling material 36 filling in the concave portion 34 was measured. The measurement results are shown in Table 1. Note that the step height shown in Table 1 represents the arithmetic mean value of the step heights of the ten samples of each of A to J. Table 2 shows the step heights of ten samples of each of A to J and the standard deviation of the step heights of ten samples of each of A to J. The step height of each sample shown in Table 2 is an arithmetic mean value of the step heights between the top surface of the recording element 32A and the top surface of the first filling material 36 filling in the concave portion 34 at a plurality of portions of each sample. Furthermore, in Tables 1 and 2, the sign "+" indicates that the top surface of the recording element is above the top surface of the first filling material 36. The sign "−" indicates that the top surface of the recording element is below the top surface of the first filling material 36.

TABLE 1

| | | Width of convex portion [nm] | Depth of concave portion [nm] | Thickness of first filling material [nm] | Thickness of detection material [nm] | Process time for flattening [sec] | Maximal count of Nb atoms | Surface step height [nm] |
|---|---|---|---|---|---|---|---|---|
| Working Example 1 | A | 90 | 18 | 20 | 0.1 | 166 | 7795 | +0.2 |
| | B | | | | 0.2 | 166 | 12495 | −0.3 |
| | C | | | | 0.3 | 167 | 18162 | +0.1 |
| | D | | | | 0.4 | 167 | 19329 | −0.1 |
| | E | | | | 0.5 | 169 | 19357 | −0.2 |
| | F | | | | 0.6 | 172 | 19096 | +0.3 |
| | G | | | | 1.0 | 178 | 17864 | −0.1 |
| | H | | | | 3.0 | 248 | 14406 | −0.3 |
| | J | | | | 5.0 | 315 | 14132 | +0.2 |
| Working Example 2 | K | | | 2 | 0.5 | 170 | 18214 | +0.3 |
| Working Example 3 | L | 180 | | 20 | | 170 | 19372 | +0.1 |
| Working Example 4 | M | | | 2 | | 171 | 13853 | +0.3 |
| Comparative Example | X | 90 | | — | | 176 | 17176 | +1.9 |

TABLE 2

| | | Standard deviation σ [nm] | Surface step height of each sample [nm] | | | | | | | | | |
|---|---|---|---|---|---|---|---|---|---|---|---|---|
| | | | 1 | 2 | 3 | 4 | 5 | 6 | 7 | 8 | 9 | 10 |
| Working Example 1 | A | 0.267 | +0.4 | +0.3 | −0.1 | −0.1 | +0.4 | −0.1 | +0.5 | +0.4 | −0.2 | +0.1 |
| | B | 0.232 | 0.0 | −0.6 | −0.3 | −0.1 | −0.3 | −0.4 | −0.3 | +0.2 | −0.4 | −0.4 |
| | C | 0.199 | +0.2 | −0.2 | −0.1 | −0.2 | 0.0 | +0.2 | +0.4 | +0.1 | +0.2 | +0.2 |

TABLE 2-continued

|  |  | Standard deviation σ [nm] | Surface step height of each sample [nm] | | | | | | | | | |
|---|---|---|---|---|---|---|---|---|---|---|---|---|
|  |  |  | 1 | 2 | 3 | 4 | 5 | 6 | 7 | 8 | 9 | 10 |
|  | D | 0.195 | +0.1 | −0.2 | −0.3 | 0.0 | +0.2 | −0.3 | −0.2 | −0.4 | −0.2 | 0.0 |
|  | E | 0.196 | −0.3 | +0.1 | −0.2 | +0.2 | 0.0 | −0.1 | −0.4 | −0.3 | −0.2 | −0.3 |
|  | F | 0.193 | +0.2 | +0.5 | +0.1 | +0.3 | 0.0 | +0.4 | +0.5 | 0.0 | +0.4 | +0.4 |
|  | G | 0.199 | −0.1 | +0.1 | −0.3 | +0.1 | +0.2 | −0.4 | −0.2 | +0.1 | −0.2 | −0.1 |
|  | H | 0.221 | −0.5 | 0.0 | −0.2 | +0.1 | −0.4 | −0.1 | −0.5 | −0.4 | −0.5 | −0.2 |
|  | J | 0.223 | +0.1 | +0.2 | −0.1 | +0.4 | +0.5 | +0.1 | −0.1 | +0.4 | 0.0 | +0.4 |
| Working Example 2 | K | 0.233 | +0.2 | +0.5 | +0.1 | +0.3 | +0.4 | 0.0 | +0.5 | +0.4 | +0.6 | −0.1 |
| Working Example 3 | L | 0.196 | −0.3 | +0.2 | +0.2 | +0.1 | −0.1 | −0.2 | 0.0 | +0.1 | +0.3 | +0.2 |
| Working Example 4 | M | 0.303 | +0.6 | +0.3 | +0.4 | 0.0 | −0.1 | +0.3 | −0.2 | +0.1 | +0.7 | +0.5 |
| Comparative Example | X | 0.232 | +2.2 | +1.9 | +2.0 | +1.7 | +1.6 | +2.1 | +1.8 | +2.1 | +1.6 | +1.6 |

WORKING EXAMPLE 2

In accordance with the third exemplary embodiment described above, ten samples of one type (K) were prepared. Note that the concavo-convex pattern of the recording layer 32 over the workpiece 10 was the same as that of A to J according to the aforementioned Working Example 1. Furthermore, there are many points in the manufacturing conditions that were common to those of A to J according to the aforementioned Working Example 1, and those common points will not be repeatedly explained.

Ten workpieces 10 having the concavo-convex patterned recording layer 32 were prepared, and the first filling material 36 was deposited on the recording layer 32 of these workpieces 10 in a thickness less than the depth of the concave portions 34. More specifically, the first filling material 36 was deposited in a thickness of 2 nm (the thickness of the first filling material 36 in the concave portion 34).

Then, by sputtering, the detection material 44 was deposited on the first filling material 36 in a thickness of 0.5 nm.

Then, by bias sputtering, the second filling material 45 was deposited on the detection material 44 of these workpieces 10 in a thickness of 58 nm to fully fill the concave portion 34.

Then, by ion beam etching, an excess of the first filling material 36, the detection material 44, and the second filling material 45 above the top surface of the recording elements 32A was removed to thereby flatten the surface.

At this time, as in Working Example 1, by secondary-ion mass spectrometry, Nb removed from and flying off the workpiece 10 (a component of the detection material 44) was detected, and the ion beam etching was stopped at the point in time at which the number of counts of Nb substantially disappeared.

After the flattening process, by AEM, the step heights between the top surfaces of the recording element 32A and the top surface of the second filling material 45 filling the concave portion 34 of each sample of K was measured. The measurement results and the like are shown in Tables 1 and 2 as with Working Example 1.

WORKING EXAMPLE 3

In contrast to E of the aforementioned Working Example 1, ten samples of one type (L) were prepared which employed a different concavo-convex pattern for the recording layer 32. More specifically, the samples prepared were provided with a recording layer 32 which had the following concavo-convex pattern with the recording elements 32A wider than those of E according to Working Example 1.

Track pitch: 300 nm
Width of the convex portion: 180 nm
Width of the concave portion: 120 nm
Step height of concavo-convex pattern (the depth of the concave portion 34): 18 nm
Range of the concavo-convex pattern formed: within the radii of 16 to 18 mm from the center Note that the other conditions were the same as those of E according to the aforementioned Working Example 1.

After the flattening process, by AFM, the step height between the top surface of the recording element 32A and the top surface of the first filling material 36 filling the concave portion 34 of each sample of L was measured. The measurement results and the like are shown in Tables 1 and 2 as with Working Example 1.

WORKING EXAMPLE 4

In contrast to K of the aforementioned Working Example 2, ten samples of one type (M) were prepared which employed the same concavo-convex pattern as that of L according to Working Example 3 for the recording layer 32 and a width of the recording elements 32A greater than that of K. The other conditions were the same as those of K according to the aforementioned Working Example 2.

After the flattening process, by AFM, the step height between the top surface of the recording element 32A and the top surface of the second filling material 45 filling the concave portion 34 of each sample of M was measured. The measurement results and the like are shown in Tables 1 and 2 as with the example 1.

COMPARATIVE EXAMPLE

In contrast to K according to the aforementioned Working Example 2, without depositing the first filling material 36, the detection material 44 was deposited directly on the recording layer 32 in a thickness of 0.5 nm, and the second filling material 45 was deposited directly on the detection material 44 in a thickness of 60 nm. With the other conditions kept the same as those of K according to the aforementioned Working Example 2, ten samples of one type (X) were prepared.

After the flattening process, by AEM, the step height between the top surface of the recording element 32A and the top surface of the second filling material 45 filling the concave portion 34 of each sample of X was measured. The measurement results and the like are shown in Tables 1 and 2 as with Working Example 1.

As shown in Table 1, the surface step height of X of Comparative Example was as large as 1.9 nm. This is thought to be because even after the detection material 44 has been fully removed, the etching proceeds further to etch the top surface of the recording elements 32A and the top surface of the second filling material 45 filling the concave portion 34. It is thus anticipated that degradation in magnetic property may be caused by the recording elements 32A being etched.

In contrast to this, any of the samples A to M of Working Examples 1 to 4 had a limited range of surface step heights of +/−0.3 nm. This is thought to be because the etching was stopped with high accuracy near the top surface of the recording element 32A. That is, according to the Working Examples 1 to 4, it was shown that the top surface of the recording elements 32A and the first filling material 36 (or the second filling material 45) can be sufficiently flattened. This is realized while the etching of the top surface of the recording elements 32A is prevented or limited to such an extent that has negligible effects on their magnetic property.

Furthermore, the samples C to G among the samples A to J according to Working Example 1, for which the detection material 44 was deposited in thicknesses of 0.3 to 1 nm, had a large maximal value (maximum value) for the number of counts of Nb. The samples D to F for which the detection material 44 was deposited in thicknesses of 0.4 to 0.6 nm had an extraordinarily large maximal value (maximum value) for the number of counts of Nb. This is thought to be because the detection material 44 was scattered over the first filling material 36 and deposited to be so thin as not to cover the first filling material 36, and most part of the detection material 44 was oxidized due to oxygen diffused from the first filling material 36 and the second filling material 45.

Note that the samples A and B for which the detection material 44 was deposited in a thickness less than 0.3 nm have a relatively small maximal value (maximum value) for the number of counts of Nb. This is thought to be because the detection material 44 was too thin and therefore absolute amount of scattered detection material 44 was too small. This shows that to allow a larger amount of the detection material 44 to be detected, the detection material 44 is deposited preferably in a thickness of 0.3 to 1 nm, more preferably in a thickness of 0.4 to 0.6 nm.

Furthermore, as shown in FIG. 16, the sample H for which the detection material 44 was deposited in a thickness of 3 nm had two maximal values for the number of counts of Nb detected in the flattening step (in the latter part of the process where parts of the detection material 44 over the concave portions 34 were etched). This is thought to be because the detection material 44 was thick and thus its parts only near the upper face 44A and the lower face 44B were oxidized.

Furthermore, M of Working Example 4 has a greater standard deviation of the step heights of ten samples than that of A to L of Working Examples 1 to 3. That is, there was a large variation in the step heights of ten samples. This is thought to be because as in the aforementioned third exemplary embodiment, M of Working Example 4 was manufactured by stopping the flattening etching based on the detection of parts of the detection material 44 over the convex portions, and the convex portions were wider than those of A to K of Working Examples 1 and 2. Thus, this caused a large variation in the point in time at which the amount of scattered detection material 44 increased sufficiently enough to be clearly distinguished from noise.

In contrast to this, L of Working Example 3 for which the convex portion of the concavo-convex pattern has the same width of 180 nm as M of Working Example 4 has an equivalent standard deviation of the step heights of ten samples to that of A to K of Working Examples 1 and 2. This is thought to be because as with the aforementioned first and second exemplary embodiments, the samples of Working Example 3 were manufactured by stopping the flattening etching based on the detection of parts of the detection material 44 over the concave portions. Thus, this caused a small variation in the point in time at which the amount of scattered detection material 44 increased sufficiently enough to be clearly distinguished from noise.

That is, the first filling material is deposited in a thickness greater than the depth of the concave portions to fully fill the concave portions of a concavo-convex pattern, and irradiation with the process gas is stopped in the flattening step based on a result of detecting a component of the detection material removed from and flying off parts of the detection material over the concave portion as in the aforementioned first and second exemplary embodiments. This makes it possible to reduce variations in step height of the surface even with wider convex portions, as shown clearly above.

The present invention can be utilized, e.g., to manufacture a magnetic recording medium, such as discrete track media or patterned media, which has a concavo-convex patterned recording layer(s).

What is claimed is:

1. A method for manufacturing a magnetic recording medium, comprising:
   a first filling material deposition step of depositing a first filling material over a workpiece to cover recording elements, the workpiece having a substrate and a recording layer formed in a predetermined concavo-convex pattern over the substrate with the recording elements formed as convex portions of the concavo-convex pattern, and to fill at least part of a concave portion between the recording elements with the first filling material;
   a detection material deposition step of depositing a detection material over the first filling material;
   a second filling material deposition step of depositing a second filling material over the detection material; and
   a flattening step of irradiating a surface of the workpiece with a process gas to remove at least part of a deposited portion above the top surfaces of the recording elements to flatten the surface, the deposited portion including any of the first filling material, the detection material, and the second filling material,
   wherein these steps are carried out in that order,
   an oxide is used as at least one of the first filling material and the second filling material,
   in the detection material deposition step, a non-oxide is deposited and scattered over the first filling material so as not to fully cover the first filling material to form the detection material,
   a component of the detection material removed from and flying off the workpiece is detected to stop irradiation with the process gas based on a result of detecting the component of the detection material in the flattening step, and
   the detection material over the recording elements is fully removed in the flattening step.

2. The method for manufacturing a magnetic recording medium according to claim 1, wherein
   in the first filling material deposition step, the first filling material is deposited in a thickness greater than a depth of the concave portion to fully fill the concave portion of the concavo-convex pattern with the first filling material, and
   in the flattening step, the irradiation with the process gas is stopped based on a result of detecting a component of the detection material removed from and flying off a part of the detection material over the concave portion.

3. The method for manufacturing a magnetic recording medium according to claim 1, wherein
in the flattening step, a component of the detection material is detected either by secondary-ion mass spectrometry or quadrupole mass spectrometry.

4. The method for manufacturing a magnetic recording medium according to claim 2, wherein
in the flattening step, a component of the detection material is detected either by secondary-ion mass spectrometry or quadrupole mass spectrometry.

* * * * *